Aug. 3, 1943.  A. W. WEITKAMP ET AL  2,325,818
VAPOR LIQUID CONTACTING APPARATUS
Filed April 30, 1941   2 Sheets-Sheet 1

Inventors:
Alfred W. Weitkamp
Alex G. Oblad
By Everett A. Johnson
Attorney.

Patented Aug. 3, 1943

2,325,818

UNITED STATES PATENT OFFICE 2,325,818

VAPOR AND LIQUID CONTACTING APPARATUS

Alfred W. Weitkamp, Whiting, Ind., and Alex G. Oblad, Chicago, Ill., assignors to Standard Oil Company, Chicago, Ill., a corporation of Indiana Application April 30, 1941, Serial No. 391,146

3 Claims. (Cl. 261—94)

Our invention relates to vapor or gas and liquid contacting devices and more particularly is directed to apparatus such as fractionating columns, scrubbing towers, and the like.

The invention contemplates providing a column packed with regularly disposed foraminous packing of capillary material such as wire gauze, perforated plate and the like having openings of such size that liquid being treated will completely seal the openings. Larger openings which are not sealed by the liquid are provided for the passage of the vapors flowing spirally and upwardly within the column. The capillary material is so arranged in the column that the liquid will have a continuous path downward, and the vapor a continuous path upward, each phase without hindrance by the other. Further, we contemplate positioning within an elongated contacting zone a foraminous packing which provides the longest possible path of contact between the two phases. It is also contemplated that a non-foraminous capillary material can be used such as, for example, etched metal or glass surfaces. Woven wire is a satisfactory foraminous material if the mesh is of such size as to be sealed by the liquid. The size of the wire and the size of the mesh, therefore, are governed by the characteristics and amount of liquid present within the zone.

More specifically our invention is an improvement over the contacting apparatus described in Stedman Patent 2,227,164. It relates to an improved method of fabrication and assembly and improved design for wire gauze packing for laboratory columns. Our improved design provides a liquid baffle between successive cells whereby all the vapors are directed in a circular path within the annular space between successive cells and travel in a substantially spiral path from bottom to top of the column. The baffle can be of capillary or non-capillary material. By suitable modification and arrangement of alternate baffles, the direction of the vapors between successive cells can be reversed. Likewise the successive baffles can be integral with each other but separate from the cones.

It is an object of our invention to provide a column with maximum contact between liquid and vapor over an extended area. Uniform distribution of both liquid and vapor throughout the available cross-section of the column is another object. A further object is to provide a packing which retains a minimum amount of liquid.

A further object is to provide a contacting device which is of simple and inexpensive construction. Another object is to provide a packing comprising a plurality of superposed capillary cells which are free to adjust themselves to the interior surface of the column. It is another object of our invention to provide means for controlling the flow of vapors between the cells. Still another object is to provide a packing which can be fabricated equally well in short or long sections. An additional object is to provide a column of increased efficiency. These and other objects will become apparent as the description of our invention proceeds.

Our invention will be understood from the following description and the accompanying drawings which form a part thereof.

Figure 1:
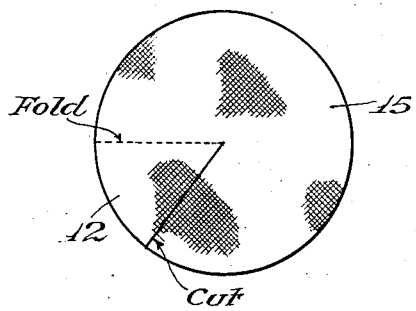
Figures 1, 2 and 3 show the formation of the cone and baffle from the wire blank.
Figure 2:
Figure 3:
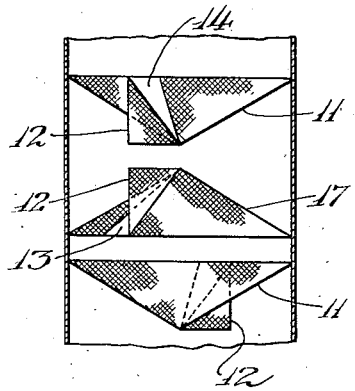

Our invention is directed to the control of the flow of the ascending vapors in the space between the cells. In the prior art packing the vapors upon entering this space subdivide and flow across the column to the next opening spaced only 180 degrees from the lower opening or inlet to the space. By our invention the ascending vapors are caused to flow in a single stream more than 180 degrees and in one embodiment all the way around the annular space between cells before entering the next cell.

Referring to the drawings, reference numeral 10 designates the wall of the column and vapors or gases enter a lower portion of the column by means not shown. The column 10 encloses a plurality of superposed elements or cones 11 and 17 designed and constructed according to our invention. Each element comprises a conical disc having an attached baffle 12 adjacent the vapor openings 13 or 14.

It is contemplated that preformed cones will be used in fabricating our column. In a preferred embodiment the manufacture of the cones comprises using an accurate, hardened die in a press to shape and cut the foraminous material which can be wire gauze. A hardened die partially forms the cone and cuts the outer edge of the formed cone. As the cone descends with an anvil, a V-shaped stationary punch cuts and forms the wing. However, if desired, the vapor openings 13 or 14 and baffle 12—12 can be produced by cutting a radial slit in the circular blank 15 of Figure 1 and turning up as a wing a segment 12 of the disc whose peripheral dimension is at least equal to the altitude of the cone 11 or 17. Subsequently, the disc is formed into a cone of smaller diameter and the vapor opening trimmed as required. In the embodiment illustrated in the drawings, each cone has a height equal to about one-half the radius of the column. Obviously, the die for forming the cones must be slotted to accommodate flap or segment 12.

When two such cones are placed apex-to-apex with the upturned segments 12 in juxtaposition, a radial baffle 12—12 is formed in the space 16 between the cones 11 and 17 and the wall of the column 10. The vapor issuing into the space 16 between the cones 11 and 17 from opening 13 of the cell below is forced to pass completely around the space 16 between the cells before entering the upper cell through the opening 14 in the upper cone 11 of the pair. Each element fits the column at least as closely as the mesh of the gauze. If it were otherwise the liquid would race down the walls of the column and efficiency would be lost. Small differences in the diameter of the column are overcome by making the element slightly oversize. The spring of the disc holds it in place, compensates for any variations in the column, and assures a very tight fit.

The cones are inserted into the column with a ramrod. No fastening of the individual cones is necessary and thus we eliminate all necessity for welding to form an integral unit. Likewise proper grinding to insure correct dimensions of the welded packing is avoided. The spring of the metal holds the cones permanently in place and a very tight fit is insured. This cannot be true of a rigid packing prepared by welding and grinding.

In operation, reflux or liquid introduced into the top of the column 10 flows over the capillary material and seals the openings. A cone 11 and an adjacent lower cone 17 together with a baffle 12—12 form one unit. The liquid flows radially inwardly in the top cone 11 vertically downward in baffle 12—12 and radially outwardly in the lower cone 17. This radially inwardly, vertically downward and radially outwardly flow in upper cone 11, baffle 12—12 and lower cone 17, respectively, continues until the liquid reaches the bottom of the column 10. The vapor enters at a point near the bottom of the column, flows upwardly following a substantially spiral path from bottom to top. The vapor flows from the outlet 13 of the lower cone 17 into the annular space 16, between the cones to the inlet opening 14 of the upper cone 11. The vapor openings 13 and 14 of any two cones 11 and 17 apex-to-apex are substantially vertically disposed and the flow in the annular space 16 between these cones is directed by the baffles 12—12 therebetween. The inlet and the outlet openings 14 and 13 of any given cell formed by the cones 11 and 17 base-to-base, however, are oppositely disposed to one another in a direction transverse to the axis of the column 10 and the packing.

This results in improved contact between ascending vapor and descending reflux with a net increase in efficiency of about 12% over a control packing without the baffles which was identical in all other constructional details, and 20% over a duplicate of the commercially available wire gauze packing described in Stedman Patent 2,227,164. These advantages in efficiency are obtained although the new packing is less expensive and no more difficult to fabricate than the ordinary conical pattern packing of the prior art.

Figure 4:
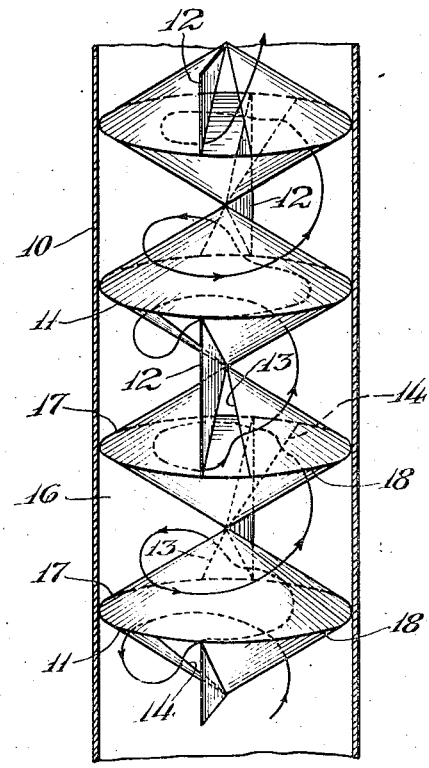
Figure 4 is an elevation in perspective of a portion of a column fabricated in accordance with our invention.
Figure 5:
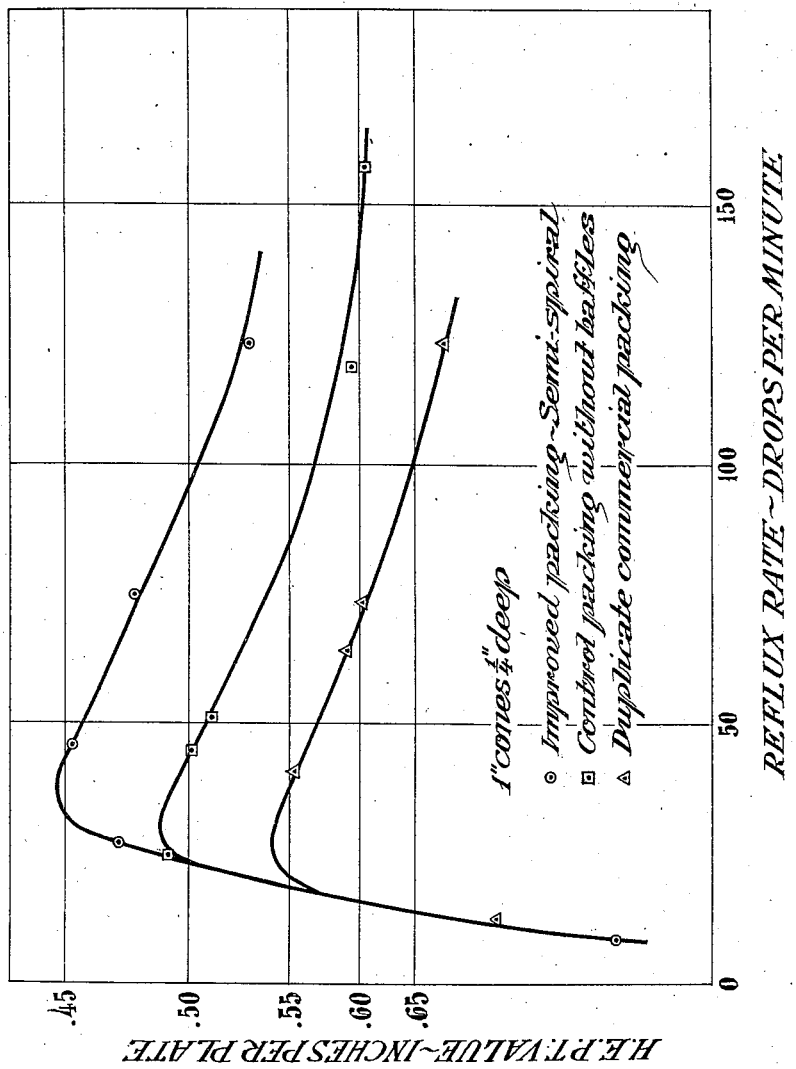
Figure 5 is a graphical representation of the increased efficiency obtained in the use of our improved packing.

Figure 5 shows the results obtained by tests of a column packed with the capillary material employing our invention. The cones were one inch in diameter, one quarter inch deep and were provided with radial external baffles. The total column was about twelve inches in height and consisted of twenty-four cells, or forty-eight cones, arranged as shown in Figure 4 in a Pyrex column equipped with silvered vacuum jackets with standard ground glass joints. A binary mixture of benzene-ethylene dichloride was used and the tests were made at atmospheric pressure with total reflux. Similar runs were made using the prior art packing and our packing without the baffles.

In the embodiment shown all the segments 12 are folded in a counterclockwise direction or to the left about one radius. That is, all the cones are of one general pattern and the vapors follow a substantially spiral path. If alternate pairs of cones 11—17 have segments folded in a counterclockwise direction, the path of the vapor becomes circular between any one pair of cells as before but the path reverses on itself in each successive flight. Thus, for example, the vapor entering a baffled zone 16 by vapor opening 13 travels in a circular path as it did in the corresponding space below the cell 18 but in a reverse direction. This results in greater efficiency by further reducing channelling of the vapor while increasing the degree and amount of contact with the liquid.

Each element in the illustrated embodiment comprises a conical disc. However, a pyramidal disc can be used with the necessary modification of the column. Therefore, "cone" as used in the specification and claims is intended to include pyramids and cones.

Although we have described our invention with reference to certain embodiments thereof it is contemplated that various changes can be made in details within the scope of our claims without departing from the spirit of our invention. It is, therefore, understood that our invention is not to be limited to the specific details shown and described.

We claim:

1. A fractionating apparatus for liquids comprising a column and a plurality of baffled cells therewithin between pairs of cones of capillary material arranged alternately base to base and apex to apex, the capillary openings of which are sealable with the liquid being fractionated, baffles of liquid-conducting capillary material extending transversely across the annular channels between the surfaces of said cones and in capillary liquid conducting contact with at least one of the adjacent cones, and vapor openings in said cones adjacent said baffles whereby ascending vapors being fractionated are forced to follow a tortuous path upward thru the apparatus in a substantially undivided stream.

2. The apparatus of claim 1 wherein said capillary material is woven wire.

3. The apparatus of claim 1 wherein the said vapor openings are in the form of segments of said cones.

ALFRED W. WEITKAMP.
ALEX G. OBLAD.